United States Patent
Litwinski

(10) Patent No.: US 9,567,113 B2
(45) Date of Patent: Feb. 14, 2017

(54) THERMAL SEAL WITH THERMALLY INDUCED SHAPE CHANGE

(71) Applicant: The Boeing Company, Chicago, IL (US)

(72) Inventor: Mary M. Litwinski, Dana Point, CA (US)

(73) Assignee: THE BOEING COMPANY, Chicago, IL (US)

( * ) Notice: Subject to any disclaimer, the term of this patent is extended or adjusted under 35 U.S.C. 154(b) by 1081 days.

(21) Appl. No.: 13/886,980

(22) Filed: May 3, 2013

(65) Prior Publication Data
US 2015/0353210 A1     Dec. 10, 2015

(51) Int. Cl.
| | | |
|---|---|---|
| *B64G 1/52* | (2006.01) | |
| *B64G 1/58* | (2006.01) | |
| *F16J 15/06* | (2006.01) | |
| *C22F 1/00* | (2006.01) | |
| *F16J 15/08* | (2006.01) | |

(52) U.S. Cl.
CPC ............. *B64G 1/58* (2013.01); *C22F 1/006* (2013.01); *F16J 15/064* (2013.01); *F16J 15/0806* (2013.01)

(58) Field of Classification Search
CPC ...... B64G 1/58; C22F 1/006; B32B 2307/306; B32B 2307/308; B32B 2307/304; B32B 2307/31; F16J 15/064; F16J 15/065
USPC .................................. 244/121, 171.7, 171.8
See application file for complete search history.

(56) References Cited

U.S. PATENT DOCUMENTS

| | | |
|---|---|---|
| 5,254,837 A | 10/1993 | Grimaldi et al. |
| 7,743,825 B2 | 6/2010 | O'Malley et al. |
| 8,047,550 B2 * | 11/2011 | Behrens ............ B64G 1/58 277/630 |
| 2009/0043288 A1 * | 2/2009 | Petrakis ............ A61M 31/002 604/890.1 |
| 2012/0219405 A1 | 8/2012 | Szwedowicz et al. |
| 2015/0083281 A1 * | 3/2015 | Lipkin ............ C22C 19/00 148/563 |

FOREIGN PATENT DOCUMENTS

| | | |
|---|---|---|
| EP | 1443175 | 8/2004 |
| EP | 2116621 | 11/2009 |

OTHER PUBLICATIONS

Jones, F.E., "The Cost of Maintaining Thermal Protection Systems," 28 pages (Jul. 1999).
Glass, D.E., "Ceramic Matrix Composite (CMC) Thermal Protection Systems (TPS) and Hot Structures for Hypersonic Vehicles," 15th AIAA Space Planes and Hypersonic Systems and Technologies Conference, 36 pages (2008).

* cited by examiner

*Primary Examiner* — Christopher P Ellis
*Assistant Examiner* — Richard G Davis
(74) *Attorney, Agent, or Firm* — Thompson Hine LLP

(57) ABSTRACT

A thermal seal may include a flexible insulation layer, and an element made of shape memory alloy attached to the insulation layer, the element being treated to bend in response to heating, whereby an increase in the temperature of the element causes the insulation layer to transform from a first configuration to a second configuration.

20 Claims, 5 Drawing Sheets

THERMAL SEAL WITH THERMALLY INDUCED SHAPE CHANGE

FIELD

The present disclosure relates to high-temperature thermal seals and, more particularly, to thermal seals that deform to effect a seal in response to heating.

BACKGROUND

Hypersonic aircraft, which may include manned and unmanned spacecraft and reentry vehicles, must have outer skins that can withstand high temperatures caused by atmospheric friction, commonly experienced upon atmospheric reentry. In addition, the skins of such vehicles must withstand the very low temperatures encountered in the cold of space, such as might be encountered while in orbit. Aluminium alloys, which typically are used for the outer skins of such vehicles, cannot withstand the high temperatures (up to 3,000° F./1,650° C.) that may be encountered upon atmospheric reentry. In order to protect the outer skin of such aircraft, thermal protection systems (TPS) have been developed.

Such thermal protection systems typically include an array of tiles that possess resistance to high temperatures of the surrounding atmosphere and also insulate the underlying aluminum alloy skin of the aircraft. The individual tiles typically are square or rectangular in shape and made from silica derived from very pure quartz sand or a combination of silica and aluminoborosilicate or alumina. The tiles are adhesively attached to the skin of the vehicle on which they are mounted, and in most applications are affixed to Nomex felt strain isolation pads (SIPs) with a room temperature vulcanizing (RTV) silicone adhesive that in turn is bonded to the skin of the vehicle. This can also apply with other types of insulative units than ceramic tile, such as high-temperature composite components (ceramic matrix composite material such as aluminosilicate/alumina, alumina/mullite, carbon/silicon carbide, silicon carbide/silicon carbide) or high-temperature metallic tiles (Inconel or titanium tiles filled with insulation).

Ideally, the thermal protection system tiles would be closely spaced on the outer skin of a vehicle, with very little or no gap between adjacent tiles, or with the gaps between tiles filled tightly. However, such filling and/or spacing can lead to high lateral stresses on installed rigid tiles, particularly during cold soak that occurs when the vehicle is in orbit and the skin and other underlying metallic structure is at its greatest contraction. It is necessary to mount the tiles on the vehicle with sufficient spacing between the tiles to accommodate cold soak conditions encountered when the vehicle is in orbit. However, during vehicle reentry, the temperatures encountered by the vehicle cause the underlying metallic skin to expand, thereby increasing the gaps between adjacent tiles. This exposes the underlying metallic skin to the high temperatures encountered in reentry. Accordingly, there is a need for a thermal seal that bridges the gaps between adjacent tiles of a thermal protection system, but does not impose unacceptably high lateral stresses on the tiles when the gaps between tiles contract during cold soak conditions.

SUMMARY

In one embodiment, a thermal seal may include a flexible insulation layer, and an element made of shape memory alloy attached to the insulation layer, the element being treated to bend in response to heating, whereby an increase in the temperature of the element causes the insulation layer to transform from a first configuration to a second configuration.

In another embodiment, a vehicle may include a fuselage having an outer skin; a thermal protection system having a plurality of heat-resistant tiles mounted on the outer skin such that gaps exist between adjacent tiles to allow for thermal expansion and contraction of the outer skin in response to heating and cooling; and a thermal seal positioned in at least one of the gaps, the thermal seal having a flexible insulation layer, an element made of shape memory alloy attached to the insulation layer, the element being treated to bend in response to heating, whereby an increase in the temperature of the element causes the element to bend and transform the insulation layer from a first configuration to a second configuration, the second configuration being shaped to fill the gap when the gap increases in response to thermal expansion of the outer skin.

In yet another embodiment, a method of making a thermal seal may include providing a flexible insulation layer, providing an element made of shape memory alloy in heat treating the element to set a heat-induced nonlinear shape, straightening the element, and attaching the element to the insulation layer, whereby increasing a temperature of the element causes the element to assume the heat-induced nonlinear shape and thereby transform the insulation layer from a first configuration to a second configuration.

Other objects and advantages of the present invention will be apparent from the following description, the accompanying drawings and the appended claims.

DETAILED DESCRIPTION

Figure 1:
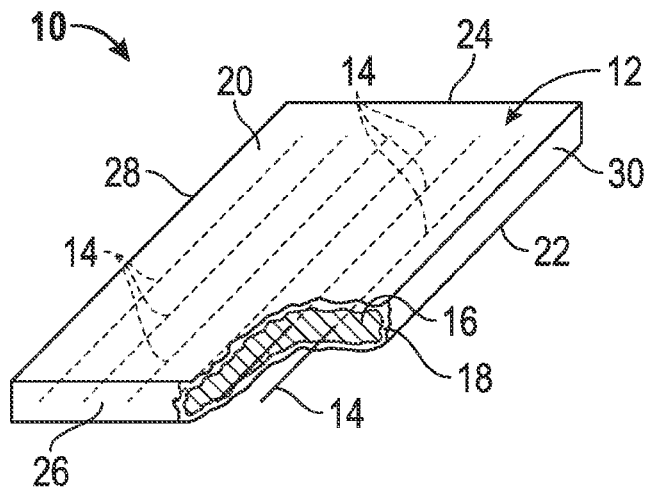
FIG. 1 shows a perspective view, partially broken away, of the disclosed thermal seal with thermally induced shape change.

As shown in FIG. 1, the disclosed thermal seal, generally designated 10, may include a flexible insulation layer, generally designated 12, and an element made of shape memory alloy (SMA) attached to the insulation layer. As will be described in greater detail, the element may be treated to bend in response to heating. In an embodiment, the element may be in the form of a plurality of wires 14, at least some of which are made of shape memory alloy. In other embodiments, the element may be in the form of one or multiple flat ribbons or a continuous sheet or sheets of shape memory alloy, or combinations thereof, attached to the insulation layer 12.

The wires 14 may be oriented parallel to each other within the insulation layer. In an embodiment, the insulation layer 12 may include an inner component 16 of batting and an outer component 18 of a woven fabric. In an embodiment, the inner component 16 may include a flexible ceramic batting, and the outer component 18 may include a woven ceramic fabric. In a particular application, the flexible ceramic batting may be selected from silica, alumina, quartz or aluminosilicate. The woven ceramic fabric may be selected from fiberglass, quartz, aluminoborosilicate, zirconia or alumina woven fabric.

The insulation layer 12 may be in the shape of a flat panel, having substantially flat, generally parallel front and rear surfaces 20, 22, respectively, substantially flat, generally parallel top and bottom surfaces 24, 26, respectively, and substantially flat, generally parallel opposing side surfaces 28, 30, respectively.

The wire 14 may be made of a shape memory alloy selected from copper-aluminum-nickel, nickel-titanium, and zinc-copper-gold-iron, and combinations of the foregoing. As shown in FIG. 1, the wires 14 may be positioned to extend parallel to each other and lengthwise within the insulation layer 12, so that they are substantially parallel to the front, rear, and side surfaces 20, 22, 28, 30 and substantially perpendicular to top and bottom surfaces 24, 26.

The wires 14 may be inserted into and extend generally centrally along a mid-thickness of the insulation layer 12. In other embodiments, the wires 14 may be positioned to extend closer to an outer surface of the insulation layer 12, and may extend obliquely within the insulation layer. Further, the wires 14 may be oriented to extend through the insulation layer 12 so that they are not parallel to each other. In still other embodiments, the wires 14 may be attached, as by an adhesive or through stitching, to the outer fabric component 18 of the insulation layer 12, or may be inserted between the outer fabric component 18 and the inner batting 16. In embodiments in which the element is in the form of a flat ribbon or ribbons, a flat sheet or sheets of SMA material, these alternate forms of elements also may be inserted into and extend generally centrally along a mid-thickness of the insulation layer 12 in the same manner as wires 14.

Figure 2:
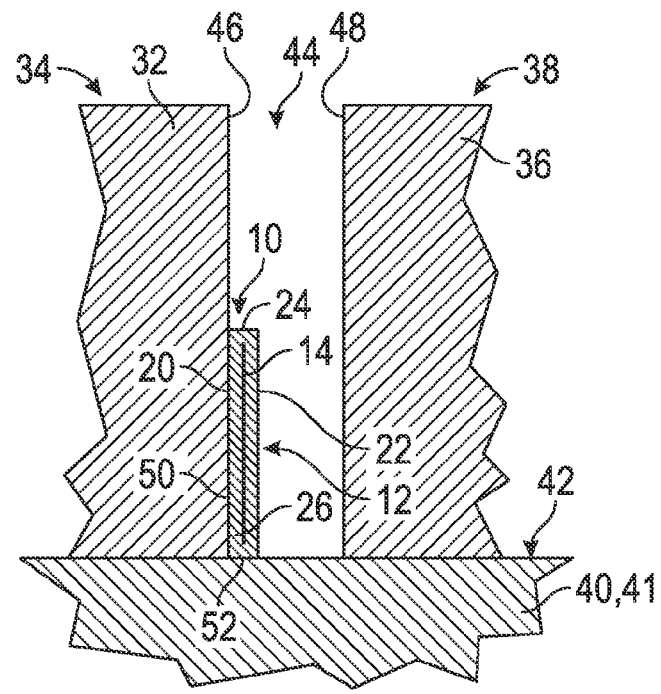
FIG. 2 is a side elevation, in section, of the thermal seal of FIG. 1, shown mounted in a first configuration in a gap between tiles of a thermal protection system.

As shown in FIG. 2, the thermal seal 10 of FIG. 1 is configured to be attached to a rigid, insulative component, which in the embodiment of FIG. 2 may be a tile 32 of a thermal protection system (TPS), generally designated 34. The TPS 34 may include an array of tiles, in which tile 32 is adjacent a tile 36 of the array 38. Tiles 32, 36 may be mounted on the skin 40 of the fuselage 41 of a vehicle 42. The skin 40 may be an aluminum alloy, and the vehicle may be one of a manned or unmanned spacecraft, a satellite, a reentry vehicle, a hypersonic missile, or an aircraft. It is contemplated that the disclosed thermal seal 10 may be most appropriately used with manned and unmanned spacecraft that undergo reentry from orbit into the earth's atmosphere.

The tiles 32, 36 may be mounted on the skin 40 of the vehicle 42, and may be mounted directly on the skin, or mounted on a Nomex felt strain isolation pad (SIP) with a room temperature vulcanizing silicone adhesive, which may then, in turn, be bonded to the skin 40 of the vehicle 42. For the sake of clarity, the SIP that may be used to attach the tiles 32, 36 to the surface 40 is not shown.

The tiles 32, 36 are spaced on the surface 40 of the vehicle 42 to form a gap 44 between adjacent end walls 46, 48 of the tiles 32, 36, respectively. The thermal seal 10 may be mounted on the end wall 46 by an adhesive applied at 50 so that a portion of the front surface 20 is attached to the end wall 46 of the tile 32. Alternately, or in addition, the bottom wall 26 of the thermal seal 10 may be attached to the skin 40 of the vehicle 42 by adhesive applied at 52.

Figure 3:
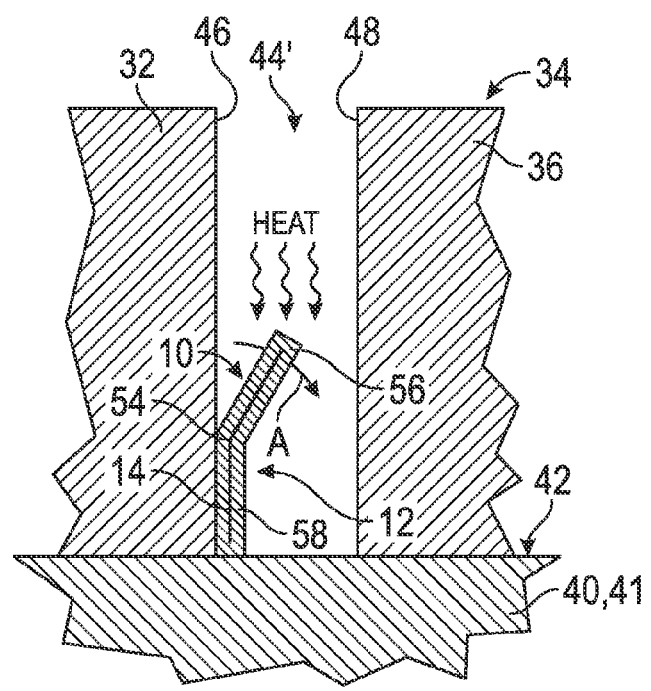
FIG. 3 is a side elevation, in section, of the thermal seal and thermal protection system tiles of FIG. 2, in which the thermal seal is increasing in temperature and transforming from a first configuration to a second configuration.

As shown in FIGS. 1 and 2, the thermal seal 10 is in a first configuration, in which the insulation layer 12 is generally planar in shape and the wires 14 are generally linear in shape. This first configuration of the thermal seal 10 may result from exposure of the wires 14 to a relatively low ambient temperature, below the activation temperature of the SMA material of the wires 14, a temperature that may be experienced by the vehicle 42 travelling at subsonic speeds, during liftoff, and/or during a cold soak in earth orbit. As shown in FIG. 3, when the vehicle 42 experiences relatively high ambient temperature, such as might be experienced during reentry, the gap 44' between tiles 32, 34 increases as a result of the expansion of the outer skin 40 of the fuselage 41. The shape metal alloy comprising the wires 14 may be annealed such that the increase in temperature of the shape metal alloy wires 14 meets or exceeds the activation temperature and causes the wires to bend at a location 54 along their lengths. This bending of the wires 14 may cause the upper portion 56 of the insulation layer 12 to bend relative to the lower portion 58 toward wall 48 of tile 34 in the direction of arrow A.

Figure 4:
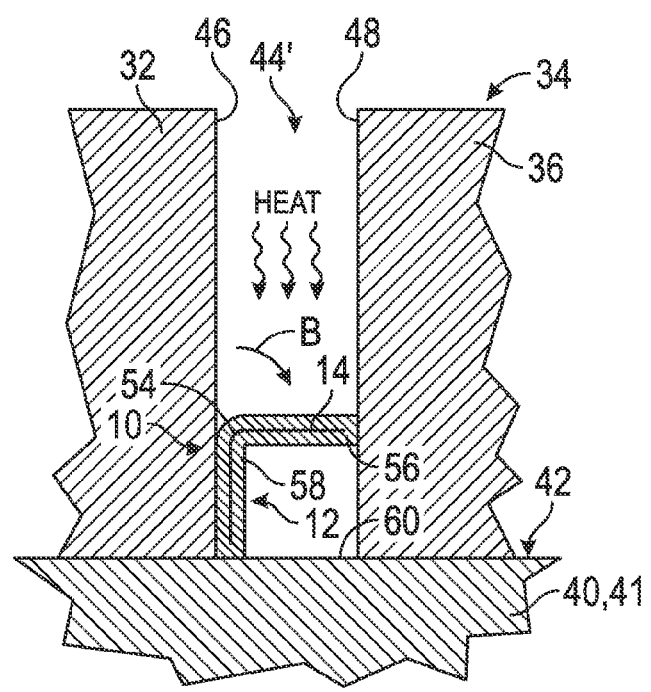
FIG. 4 is a side elevation, in section, of the thermal seal and thermal protection system tiles depicted in FIG. 2, in which the thermal seal has increased in temperature sufficient to transform to the second configuration.

As shown in FIG. 4, with continued increase of the temperature of the wires 14 within the insulation layer 12 from being heated by an increase in ambient temperature, the wires may continue to bend in the direction of arrow B until the upper portion 56 of the thermal seal 10 extends from the end wall 46 of tile 32 to the end wall 48 of adjacent tile 34. This upper portion 56 may form a seal between the tiles 32, 34 to protect the exposed area 60 of the outer skin 40 of the fuselage 41 of the vehicle 42. Thus, as a result of an increase in temperature of the wires 14, the thermal seal 10 may be transformed to a second configuration shown in FIG. 4.

Although the second configuration of the thermal seal 10 in FIG. 4 shows an upper portion 56 at substantially a right angle to the lower portion 58, in embodiments the angle made may be less than a right angle (i.e., an obtuse angle), or may be greater than a right angle (i.e., an acute angle). In other embodiments, the upper portion 56 may not contact the end wall 48 when the insulation layer 12 is in the second configuration. In still other embodiments, the wires 14 may be treated so that, when heated, the wires bend to cause the insulation layer 12 to form an arcuate shape that may curve toward the end wall 48.

Figure 7:
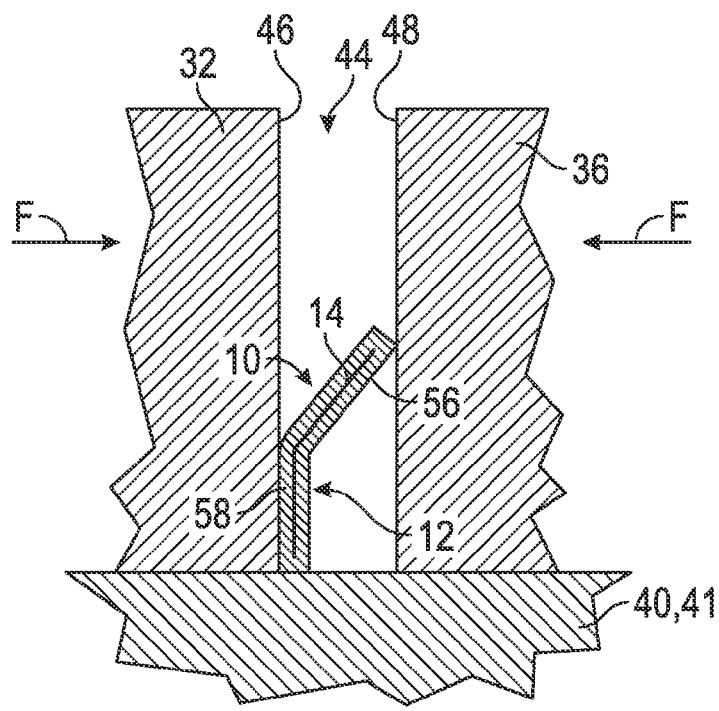
FIG. 7 is a side elevation, in section, of the thermal seal of FIGS. 2, 3 and 4, shown after cooling.

After reentry, the skin 40 of the fuselage 41 may cool and shrink, so that the gap 44' between adjacent tiles 32, 36 may reduce in width to the distance of the gap 44 shown in FIG. 7. The movement of the tiles 32, 36 in the direction of arrows F may cause the upper portion 56 of the thermal seal 10 to bend back. Subsequent increases in temperature sufficient to cause the tiles 32, 36 to separate to gap 44' (FIG. 4) also may cause the thermal seal 10 to bend to the second configuration shown in FIG. 4, and thus provide a thermal seal to protect exposed area 60.

Figure 5:
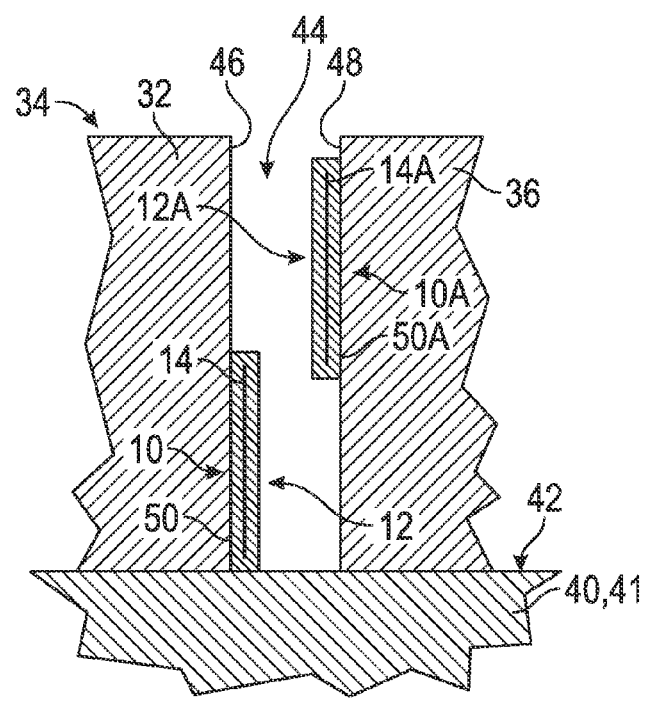
FIG. 5 is a side elevation, in section, of an alternate application of the disclosed thermal seal with thermally induced shape change, in which two insulation layers in the first configuration are mounted in a gap between adjacent thermal protection system tiles.
Figure 6:
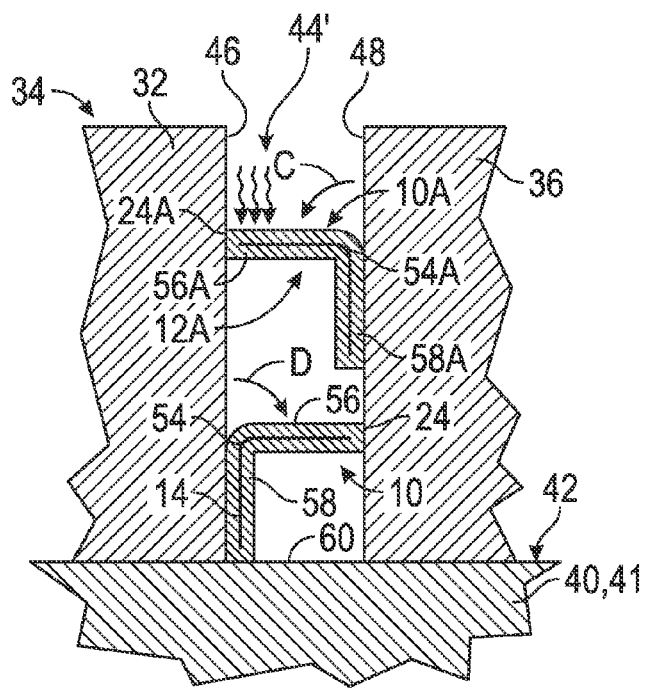
FIG. 6 is a side elevation, in section, of the thermal seal of FIG. 5, in which the insulation layers have increased in temperature sufficiently to transform to the second configuration to create a labyrinth seal.

An alternate design is shown in FIGS. 5 and 6. As shown in FIG. 5, thermal seals 10 and 10A are positioned within a gap 44 between adjacent tiles 32, 36 of a TPS 34. Thermal seal 10 may be attached to side wall 46 of tile 32 near the skin 40 of the fuselage 41. Thermal seal 10A may be attached at 50A to side wall 48 of tile 36 so that it is spaced above the skin 40 of the fuselage 41 of the vehicle 42. As shown in FIG. 5, each of the thermal seals 10, 10A may be in the first configuration, in which the internal wires 14, 14A of shape memory alloy may be oriented to be substantially linear in shape, and accordingly, the insulation layers 12, 12A may be in the shape of a flat panel. This is the configuration of thermal seals 10, 10A that would appear when the wires 14, 14A are below the activation temperature that would result in their being bent.

As shown in FIG. 6, when the skin 40 of the fuselage 41 of the vehicle 42 becomes heated, for example, when the associated vehicle 42 is in reentry, the width of the gap 44' may increase between adjacent tiles 32, 36. At the same time, the wires 14, 14A, which may have exceeded the activation temperature of their SMA composition, may become bent at 54, 54A, respectively, thereby bending the upper portions 56, 56A of the insulation layers 12, 12A in the direction of arrows C and D to extend across the gap 44', so that the thermal seals are transformed into the second configuration. The upper portion 56 of thermal seal 10 may be shaped to extend across the gap 44' so that the top wall 24 may contact end wall 48 of tile 36. Similarly, the thermal seal 10A may be sized such that the top wall 24A of the insulation layer 12A may contact wall 46 so that the upper portion 56A may extend across the gap 44'.

The combination of the thermal seals 10, 10A may cooperate to form a labyrinth seal or double seal in the gap 44' between the tiles 32, 36, that may protect the exposed area 60 of the skin 40 of the fuselage 41. The upper portions 56, 56A may be spaced sufficiently apart such that when the upper portions travel along arcs represented by arrows C, D, respectively, the upper portions 56, 56A do not interfere with each other. Upon a decrease in temperature of the skin 40, such as after reentry, the skin may shrink and the gap 44' shrink to gap 44. This movement also may bend the seals 10, 10A in a manner similar to that for seal 10 shown in FIG. 7.

Figure 8:
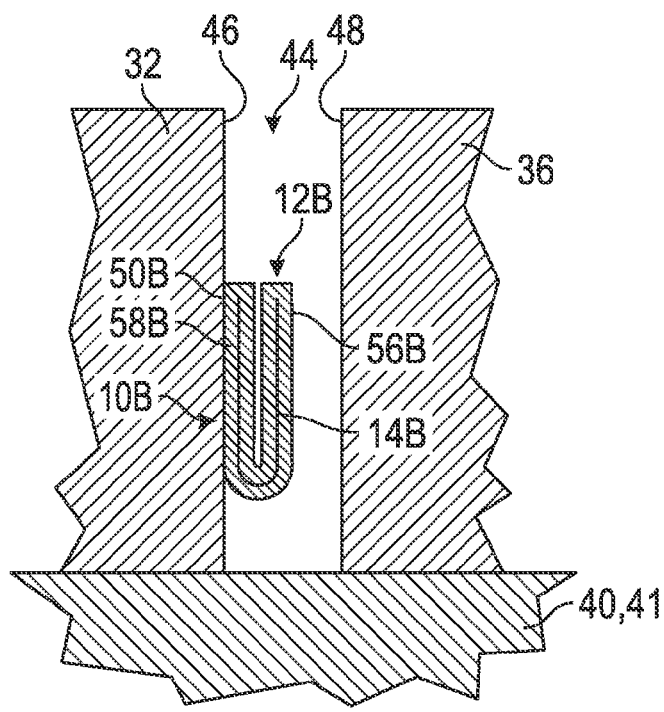
FIG. 8 is a side elevation, in section, of another alternate application of the disclosed thermal seal with thermally induced shape change, shown in the first configuration.
Figure 9:
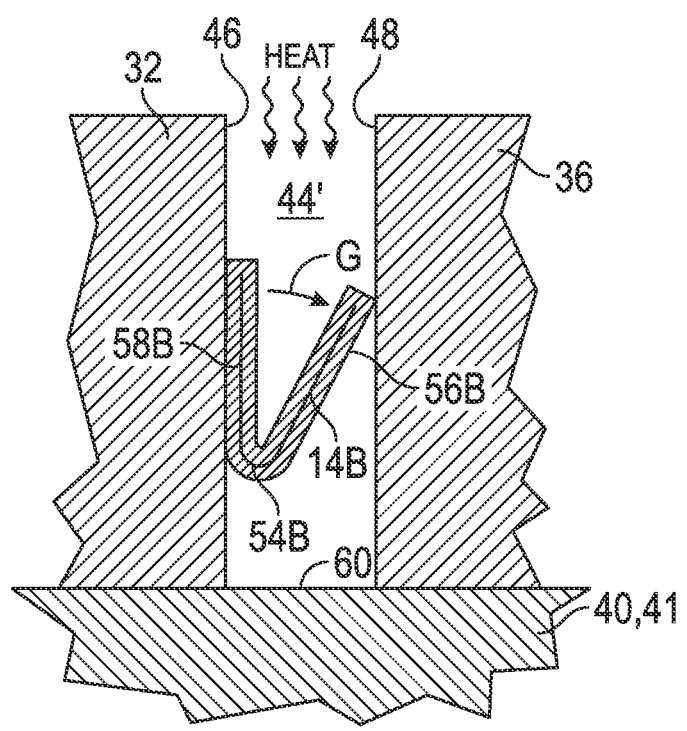
FIG. 9 is a side elevation, in section, of the thermal seal of FIG. 8, in which the thermal seal has increased in temperature sufficiently to transform to the second configuration.

As shown in FIG. 8, a thermal seal 10B may be formed to have a first configuration that is U-shaped when below the activation temperature, and may include a U-shaped panel flexible insulation layer 12B and a U-shaped element in the form of an SMA wire 14B extending therethrough. The layer 12B may be made of a flexible batting and an outer component of a woven fabric, as shown in FIG. 1. The seal 10B may be bonded to the end wall 46 of a tile 32 at 50B. As shown in FIG. 9, when the temperature of the wire 14B reaches the activation temperature, the wire may bend from the U-shape in FIG. 7 to a V-shape, and thus bend the upper portion 56B in the direction of arrow G until the upper portion contacts end wall 48 of tile 36, thus bending the insulation layer 12B into a V-shaped second configuration, to make a seal across gap 44' to cover and protect exposed area 60. Upon subsequent cooling, the shrinking skin 40 moves tiles 32, 36 toward each other, shrinking the distance between the tiles to gap 44. This movement may bend the upper portion 56B back toward the lower portion 58B.

The method of making the thermal seal 10 may include an initial step of providing an insulation layer 12 that includes an outer layer 18 of a fabric, such as woven ceramic fabric, and an inner batting 16, such as a flexible ceramic batting. Elements of shape memory alloy, such as wires 14, may be heat treated to set a heat-induced nonlinear shape to the elements, such that, upon heating to a predetermined temperature (e.g., 150° C.) the elements may assume the nonlinear shape, such as the shapes shown in FIGS. 4 and 6. The elements may be straightened and attached to the insulation layer 12, which in an embodiment may include inserting the wires 14 into the insulation layer 12. The insulation layer 12 may then be attached to the end wall 46 of a the 32 of a TPS 34.

The disclosed thermal seal 10 thus may provide a lightweight and reliable seal between adjacent tiles of a TPS that may adjust (i.e., deploy) automatically in response to changes in the spacing between the tiles caused by changes in ambient temperature that may cause the associated skin of the vehicle on which the tiles are mounted to expand and contract. Because the thermal seal 10 relies on elements 14 made of shape memory alloy material, the seals may react to changes in temperature, filling the gap when the temperature of the elements increases by transforming to the second configuration, and transforming back to the first configuration when temperatures decrease sufficiently to decrease the spacing between tiles. Thus, the adjustment mechanism of the thermal seal 10 does not rely on motors, sensors or control systems, thus reducing the overall cost of fabrication and operation of the thermal seals.

While the forms of apparatus herein described constitute preferred embodiments of this invention, it is to be understood that the invention is not limited to these precise forms of apparatus, and that changes may be made therein without departing from the scope of the invention.

What is claimed is:

1. A thermal seal comprising:
 a flexible insulation layer; and
 an element made of shape memory alloy attached to the insulation layer, the element being treated to bend in response to heating, whereby an increase in the temperature of the element causes the insulation layer to transform from a first configuration to a second configuration;
 wherein the insulation layer is configured to be attached to a rigid, insulative component of a thermal protection system.

2. The thermal seal of claim 1, wherein the element is inserted into and contained within the insulation layer.

3. The thermal seal of claim 1, wherein the element is selected from a wire, a ribbon and a sheet.

4. The thermal seal of claim 1, wherein the insulation layer includes an inner component of a flexible batting and an outer component of a woven fabric.

5. The thermal seal of claim 4, wherein the flexible batting is selected from: a flexible ceramic batting and a high-temperature felt; and the woven fabric is selected from: a woven glass and a woven ceramic fabric.

6. The thermal seal of claim 5, wherein the flexible ceramic batting is selected from: silica, alumina, quartz, and aluminosilicate; and the woven ceramic fabric component is selected from: fiberglass, quartz, aluminoborosilicate, zirconia and alumina woven fabric.

7. The thermal seal of claim 1, wherein the shape memory alloy is selected from copper-aluminum-nickel, nickel-titanium, and zinc-copper-gold-iron.

8. The thermal seal of claim 1, wherein the element made of shape memory alloy is treated to bend in response to an increase in temperature from one of straight and U-shaped in the first configuration, to one of bent and V-shaped in the second configuration.

9. The thermal seal of claim 1, wherein the insulation layer is in the shape of a flat panel.

10. The thermal seal of claim 1, wherein the element is selected from a plurality of wires, at least some of which are of shape memory alloy, one or multiple flat ribbons of shape memory alloy, a continuous sheet or sheets of shape memory alloy, or combinations thereof.

11. A vehicle comprising:
a fuselage having an outer skin;
a thermal protection system having a plurality of heat-resistant tiles mounted on the outer skin such that gaps exist between adjacent tiles to allow for thermal expansion and contraction of the outer skin in response to heating and cooling; and
a thermal seal positioned in at least one of the gaps, the thermal seal having a flexible insulation layer, an element made of shape memory alloy attached to the insulation layer, the element being treated to bend in response to an increase in temperature, whereby an increase in the temperature of the element causes the element to bend and transform the insulation layer from a first configuration to a second configuration, the second configuration being shaped to fill the gap when the gap increases in response to thermal expansion of the outer skin.

12. The vehicle of claim 11, wherein the vehicle is selected from a manned spacecraft, an unmanned spacecraft, a satellite, a reentry vehicle, a hypersonic missile, and an aircraft.

13. The vehicle of claim 11, wherein the insulation layer is in the shape of a flat panel and oriented parallel to opposing side surfaces of the adjacent tiles.

14. The vehicle of claim 13, wherein the element is positioned within the insulation layer.

15. The vehicle of claim 13, wherein the element is selected from a wire, a ribbon and a sheet.

16. The vehicle of claim 13, wherein the insulation layer includes an inner component of a flexible batting and an outer component of a woven fabric.

17. The vehicle of claim 13, wherein the flexible batting includes a flexible ceramic batting, and the woven fabric includes a woven ceramic fabric.

18. The vehicle of claim 13, wherein the insulation layer is attached to one of a side surface of a tile of the plurality of heat-resistant tiles and the skin of the vehicle.

19. The vehicle of claim 13, further comprising the thermal seal having a second insulation layer, a second element made of shape memory alloy attached to the second insulation layer, the second element being treated to bend in response to heating, whereby heating the second element causes the second insulation layer to transform from a first configuration to a second configuration, the second configuration being shaped to fill the gap when the gap increases in response to thermal expansion of the outer skin, whereby the insulation layer and the second insulation layer co-operate to form a labyrinth seal between the adjacent tiles.

20. A method of making a thermal seal, the method comprising:
forming a flexible insulation layer, wherein the insulation layer is configured to be attached to a rigid, insulative component of a thermal protection system;
heat treating an element made of shape memory alloy to set a heat-induced nonlinear shape;
straightening the element; and
attaching the element to the insulation layer, whereby increasing a temperature of the element causes the element to assume the heat-induced nonlinear shape and thereby transform the insulation layer from a first configuration to a second configuration.

* * * * *